United States Patent [19]
Kiritani et al.

[11] 4,184,387
[45] Jan. 22, 1980

[54] VEHICLE FOR CIVIL ENGINEERING WORK

[75] Inventors: Masaaki Kiritani; Mitsugu Kanai, both of Hirakata; Denzaburo Harada, Katano; Chikashi Nishida, Sakai; Yoshiyuki Asanuma, Uji; Kenji Ikeda; Kouzi Masutani, both of Sakai, all of Japan

[73] Assignee: Kubota, Ltd., Osaka, Japan

[21] Appl. No.: 793,324

[22] Filed: May 3, 1977

[30] Foreign Application Priority Data

Jul. 21, 1976 [JP] Japan ............................ 51-86908
Jan. 14, 1977 [JP] Japan ............................ 52-3141

[51] Int. Cl.² .................. F16H 37/06; B62D 11/00; B62D 11/10
[52] U.S. Cl. ........................... 74/720.5; 74/665 T; 180/6.44
[58] Field of Search .......... 74/720, 720.5, 665 S, 74/665 T, 710.5, 665 H, 665 K; 180/6.2, 6.44

[56] References Cited

U.S. PATENT DOCUMENTS

| | | | |
|---|---|---|---|
| 2,353,554 | 7/1944 | Gates | 74/665 T X |
| 2,391,735 | 12/1945 | Orshansky, Jr. | 74/720 X |
| 3,398,819 | 8/1968 | Ruhl et al. | 74/665 T X |
| 3,520,376 | 7/1970 | Muller | 74/720.5 X |
| 3,529,492 | 9/1970 | Tuck | 74/720.5 |
| 3,620,319 | 11/1971 | Armasow et al. | 180/6.44 |
| 3,620,320 | 11/1971 | Armasow | 74/720.5 X |
| 3,831,690 | 8/1974 | Yamaoka et al. | 74/665 T X |
| 3,966,005 | 6/1976 | Binger | 74/720.5 X |

FOREIGN PATENT DOCUMENTS

| | | | |
|---|---|---|---|
| 871564 | 2/1953 | Fed. Rep. of Germany | 74/720.5 |
| 1555338 | 10/1970 | Fed. Rep. of Germany | 74/720.5 |
| 1780106 | 12/1971 | Fed. Rep. of Germany | 180/6.44 |
| 1442549 | 7/1976 | United Kingdom | 74/720.5 |

*Primary Examiner*—Lance Chandler
*Attorney, Agent, or Firm*—Edwin E. Greigg

[57] ABSTRACT

A vehicle with an engine, a torque converter, planetary gearing sets operatively connected with the torque converter, running means on either lateral side operatively connected with the respective planetary gearing set, a turning drive mechanism with two output shafts to rotate in opposite directions with each other and switching over means for selectively switching over output rotation directions of the turning drive mechanism. The turning drive mechanism takes the driving power from input side of the torque converter and transmits the power to drive either sun gear or planetary gears of the planetary gearing sets, thus to cause differential rotary speeds of the running means on one side as compared with the other side. The vehicle can thus turn very sharply when it travels at slow speed.

5 Claims, 7 Drawing Figures

VEHICLE FOR CIVIL ENGINEERING WORK

BACKGROUND OF THE INVENTION

This invention relates to a vehicle for civil engineering work or some other work, equipped with a torque converter, with no steering wheel for turning the vehicle. As the technique for turning the vehicle of this type, it is generally known to engage and disengage the driving power to the running means on any side, by clutching, independently from the running means on the other side. However, such clutching operation is quite difficult and it is hard to properly turn the vehicle safely with a predetermined radius of turning curvature when the vehicle is running at high speed, thus causing turnover of the vehicle from time to time at such turning. At low speed running, on the other hand, it is often desired to turn the vehicle with as small radius of turning curvature as possible, but such turning operation is very difficult even for the operator of considerable skill. There have been no conventional means for automatically realizing safe mild turning of the vehicle at high speed running and desired sharp turning with small radius of turning curvature at low speed running.

SUMMARY OF THE INVENTION

In view of the conventional difficulties as described above, this invention aims to solve the problem by providing a novel turning drive mechanism making best use of the characteristics of a torque converter equipped in the vehicle. Main object of this invention is thus to provide an apparatus as will automatically realize safe mild turning of the vehicle at high speed running and desired sharp turning with small radius of turning curvature at low speed running. To attain the object, the vehicle for civil engineering work according to this invention comprises: an engine; a torque converter; a pair of planetary gearing sets, each with a sun gear, planetary gears pivotally journaled on a planetary gear support, and an outer gear, operatively connected with the torque converter to take input power to the outer gear from output side of the torque converter; running means on either side, operatively connected with either the sun gear or the planetary gear support of the respective one of the planetary gearing sets; a turning drive mechanism with one input shaft and two output shafts to rotate in opposite directions one with the other, with the input shaft operatively connected with input side of the torque converter, and with the output shafts each operatively connected with either the planetary gear support of the planetary gearing, when the sun gear thereof is operatively connected with the running means, or the sun gear of the planetary gearing, when the planetary gear support thereof is operatively connected with the running means; and switching over means for selectively switching over rotation directions of the output shafts of the turning drive mechanism driven from the input side of the torque converter rotating in a constant direction.

When running speed of this vehicle is reduced, thus with slow driving rotation of the torque converter, then the speed ratio of the torque converter is lowered, according to the general characteristics of the torque converter, to have the value substantially less than unity, thus the output side thereof rotating substantially slower than the input side thereof, in other words with far reduced rotational speed of both of the outer gears of the planetary gearing sets, driven in a same uniform direction from the output side of the torque converter, and with thus relatively higher rotational speed of the sun gears or the planetary gear supports, driven in opposite directions one set of the gearing with the other set from the input side of the torque converter via the turn drive mechanism; thereby resulting in driving the running means on either side in opposite directions one with the other, thus to turn the vehicle with quite small radius of turning curvature. On the other hand, when the vehicle is running at high speed, then the speed ratio of the torque converter is near unity, thus both the input and output sides thereof rotating at approximately same speed and the relative difference of the driving speed of the running means on either side being now comparatively small, thereby resulting in mild turning of the vehicle.

Another object of this invention is to provide an apparatus with means for switching over forward and rearward travel of the vehicle, without effecting attainment of the said main object during the rearward travel as well as during the forward travel.

Still another object of this invention is to provide an apparatus with wider speed changing range in addition to the range obtained by the torque converter, without affecting attainment of the said main object.

Yet another object of this invention is to provide a vehicle with the apparatus for attaining the main object, with further possibility of spinning turn, namely of turning around at the standstill of the vehicle, about the center thereof.

Other objects and advantages of this invention will become apparent from the following detailed description of some preferred embodiments of the invention illustrated in the accompanying drawings.

DESCRIPTION OF THE PREFERRED EMBODIMENTS

Figure 1:
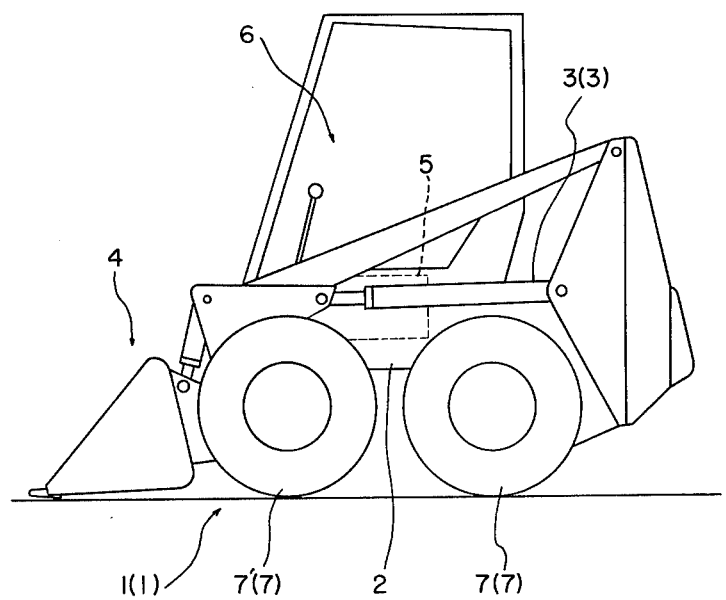
FIG. 1 is an overall side elevation of a shovel loader shown as an example of a vehicle for civil engineering work to which this invention may be applied.

FIG. 1 shows a shovel loader with running means 1 on either side supporting chassis 2 on which there are equipped a shovel working apparatus 4 as is rockingly raised and lowered by actuation of a pair of hydraulic cylinders 3, an engine 5 and maneuvering quarter 6.

Figure 2:
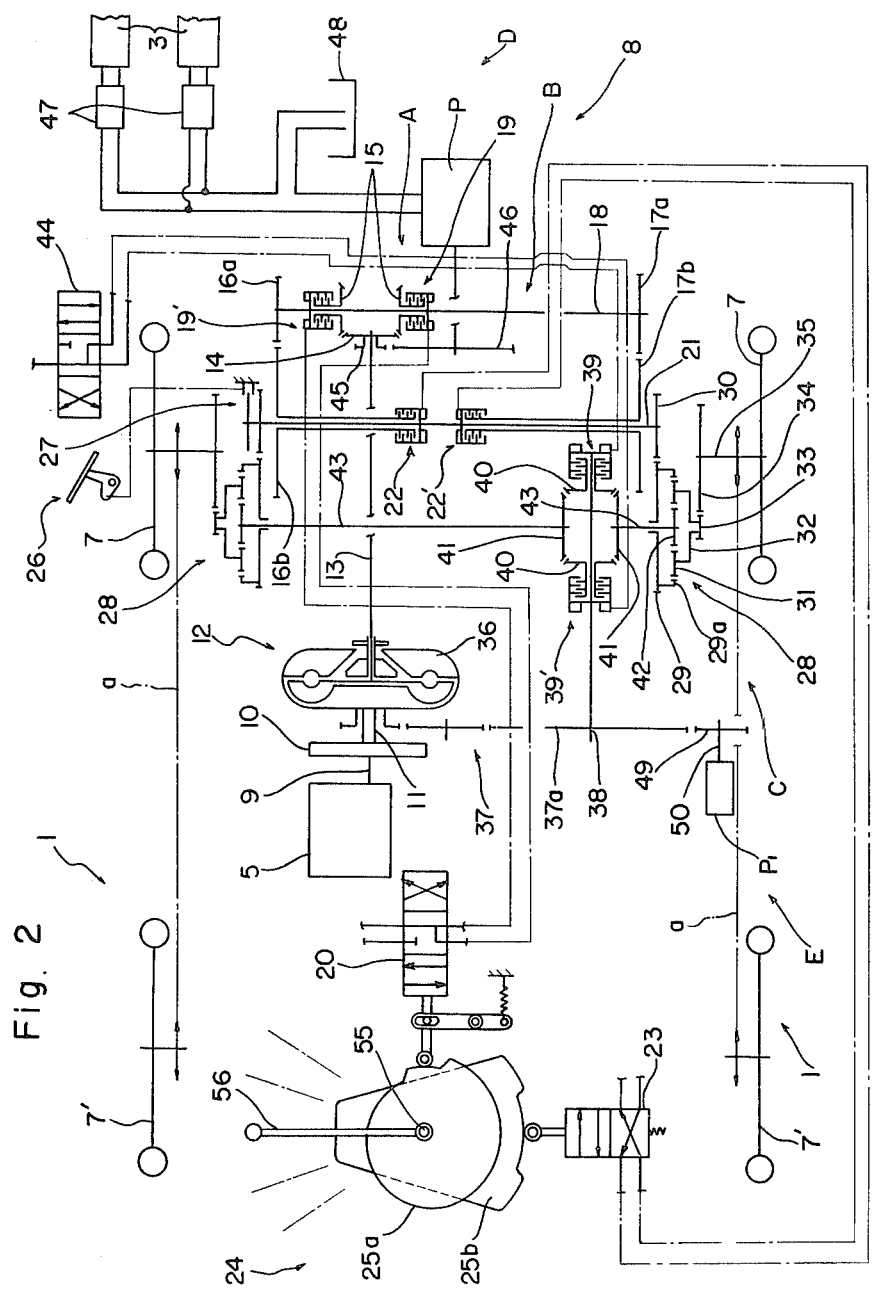
FIG. 2 is a schematic diagram of driving system according to this invention.

This shovel loader is supposed to be equipped with the driving system according to this invention as schematically shown in FIG. 2. The running means 1 comprises right and left pairs of front and rear wheels 7', 7 each, each pair being interlockingly driven with transmission means a therefor. As is seen, the rear wheels 7 on either side are immediately driven by driving mechanism generally designated at 8, while the front wheels 7' on either side are driven subsequently to the rear wheels 7.

The driving mechanism 8 starts with the engine 5, whose output shaft 9 has a flywheel 10 thereon. A torque converter 12 is operatively connected with flywheel shaft 11, and on turbine output shaft 13 thereof there is provided a bevel gear 14. Two bevel gears 15 are loosely fitted on a shaft 18 for free rotation relative thereto and both in constant meshing engagement with the bevel gear 14. On the shaft 18 there are fixed two spur gears 16a and 17a which have different numbers of teeth with each other. Hydrostatic clutches 19 and 19' are provided in between the shaft 18 and the two bevel gears 15, respectively, for freely engaging and disengaging the shaft 18 and the bevel gears 15, separately of each other, and actuating hydraulic fluid is supplied through a control valve 20 and through hollow duct in the shaft 18. With this construction, actuation of the valve 20 for neutralization or selective engagement of either one of the clutches 19 and 19' will disconnect or transmit the rotation of the turbine output shaft 13 to the shaft 18, in any desired rotational direction, thus making up forward and rearward travel changing over mechanism designated generally at A. Speed changer gears 16b and 17b are loosely fitted on a shaft 21 for free rotation relative thereto, in constant meshing engagement with the gears 16a and 17a, respectively, of the different teeth numbers with each other; and hydrostatic clutches 22 and 22' are provided in between the shaft 21 and the gears 16b and 17b, respectively, for freely engaging and disengaging the shaft 21 and the gears 16b and 17b, separately of each other. A control valve 23 is provided for actuating the clutches 22 and 22'. With this construction, actuation of the valve 23 will transmit the reversible rotation of the shaft 18 to the shaft 21 either in low speed via the meshing gears 16a and 16b or in high speed via the meshing gears 17a and 17b, thus making up higher and lower two-step speed changer mechanism for the reversible rotation, designated generally at B.

On the speed changer output shaft 21 there are fixed: braking means 27 (illustrated in a form of a disc brake) to be actuated with adjustable braking effort by properly treading a brake pedal 26; as well as two transmission gears 30 in constant meshing engagement with outer teeth provided on outer gear blocks 29 of planetary gearing sets 28 on either side, respectively. Each of the outer gear blocks 29 has inner teeth to serve as an annular gear 29a in constant meshing engagement with planetary gears 31 pivotally journaled on a planetary gear support 32 which has a gear 33 as formed integrally therewith to be in constant meshing engagement with a gear 34 fixed on axle 35 of the rear wheel 7.

Designated generally at 37 is a transmission mechanism for transmitting the driving power of the input pump vane wheel 36 side of the torque converter 12 to a shaft 38 in a reduced rotation speed. On the shaft 38 there are provided hydrostatic clutches 39 and 39' and an opposing pair of bevel gears 40 are lossely fitted via them. In constant meshing engagement with both of the bevel gears 40 are another opposing pair of bevel gears 41 fixed on shafts 43 which in turn are fixed to and extending from sun gears 42 of the planetary gearing sets 28 on either side, respectively. By actuating a control valve 44 for the clutches 39 and 39', the rotation of the shaft 38 may be disconnected or transmitted to the two shafts 43, the transmission being in such manner that the two shafts 43 will rotate in opposite directions with each other, with free changing over of the directions. The clutches 39 and 39' thus constitute turning actuation mechanism for disconnection and transmission of the driving power to the two shafts 43 in opposite rotational directions for the respective inputs thereof. This actuation mechanism 39, 39' and the bevel gearing thus make up the drive mechanism designated generally at C, for imparting, from upstream side of the torque converter 12, to the two shafts 35 extending from the planetary gearing sets 28 on either side, respectively, the rotation drives in opposite directions with each other, in addition to the rotation drives imparted from downstream side of the torque converter 12.

The driving mechanism 8 thus comprises the forward and rearward travel changing over mechanism A, the speed changer mechanism B and turn drive mechanism C.

Drive mechanism D for the shovel working apparatus 4 is interconnected with the bevel gear 14 constituting the forward and rearward travel changing over mechanism A, while drive mechanism E for charging the torque converter 12 is interconnected with the gearing transmission mechanism 37, as described hereunder in more detail:

The shovel working apparatus driving mechanism D takes out power for a pump P by meshing a gear 46 with a gear 45 formed integrally with the bevel gear 14. The pump P is connected to the cylinders 3 via control valves 47, respectively, and a reservoir tank 48 for the actuating hydraulic medium is mounted on a rear portion of the vehicle body.

Figure 3:
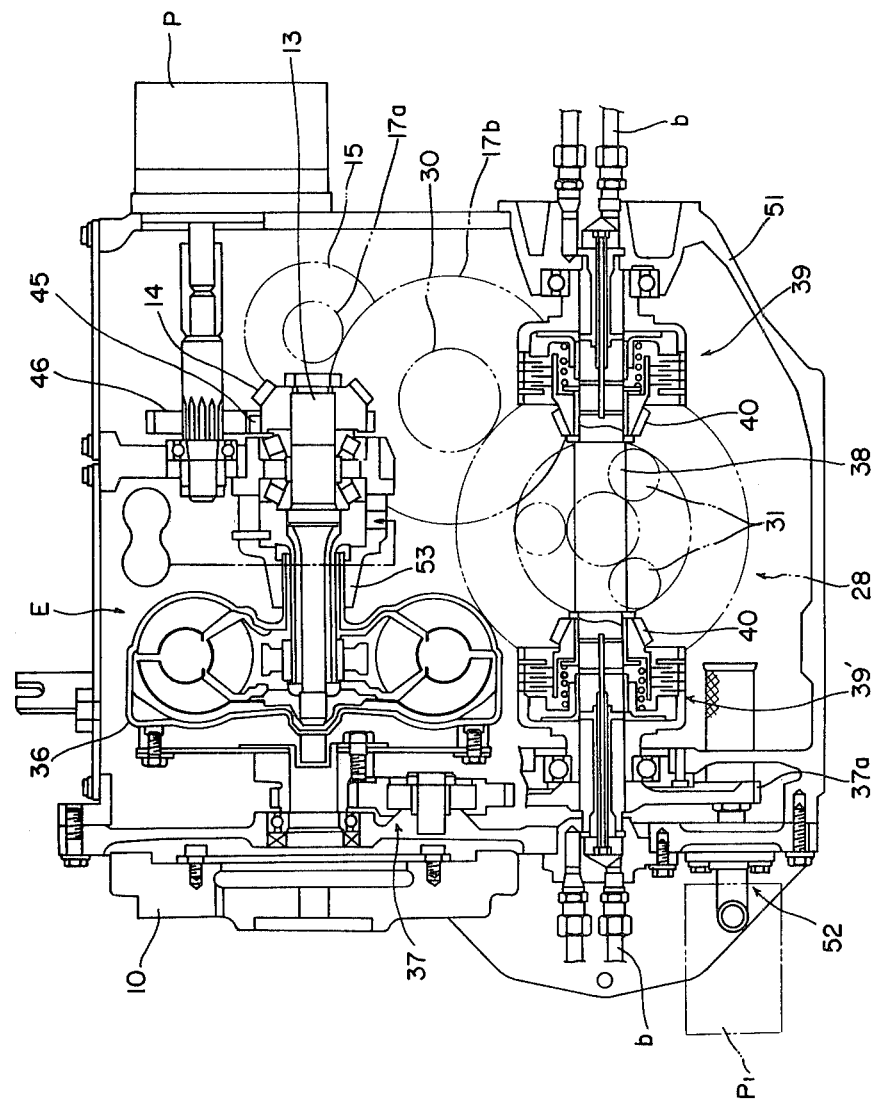
FIGS. 3 and 4 are schematic sectional views of the actual construction of the driving system shown in FIG. 2.
Figure 4:
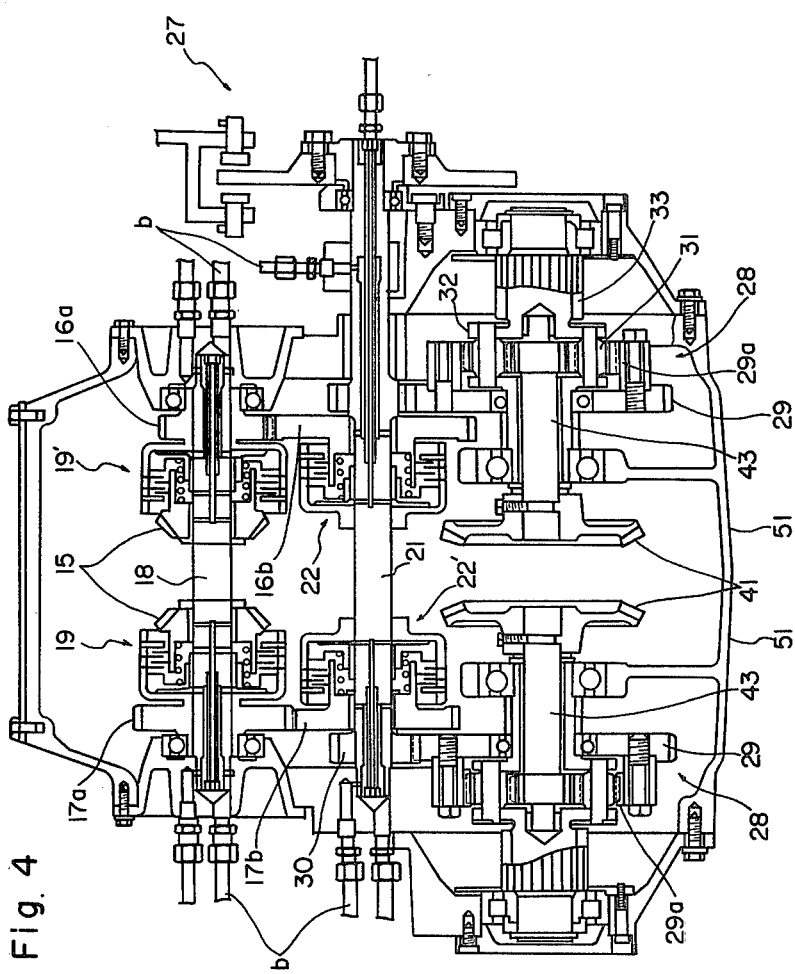

Referring also to FIGS. 3 and 4 in addition to FIG. 2, the torque converter charging drive mechanism E is so constructed that a gearing 49 is provided in meshing engagement with reduction gear 37a of the gearing transmission mechanism 37 and on to power takeout shaft 50 thereof a charge pump $P_1$ is connected.

The gears 46 and 49 of the two drive mechanisms D and E as well as driving components of the driving mechanism 8 are accommodated in a casing 51. This case 51 retains the liquid to serve as lubricant for the accommodated gears, operating medium for the torque converter 12, and actuating medium for the clutches 19, 19', 22, 22', 39 and 39'. Thus, the same liquid medium for operating the torque converter is made also to perform lubrication of the drive mechanisms and actuation of the clutches. The torque converter 12 itself is supposed to be of liquid bath type.

Figure 5:
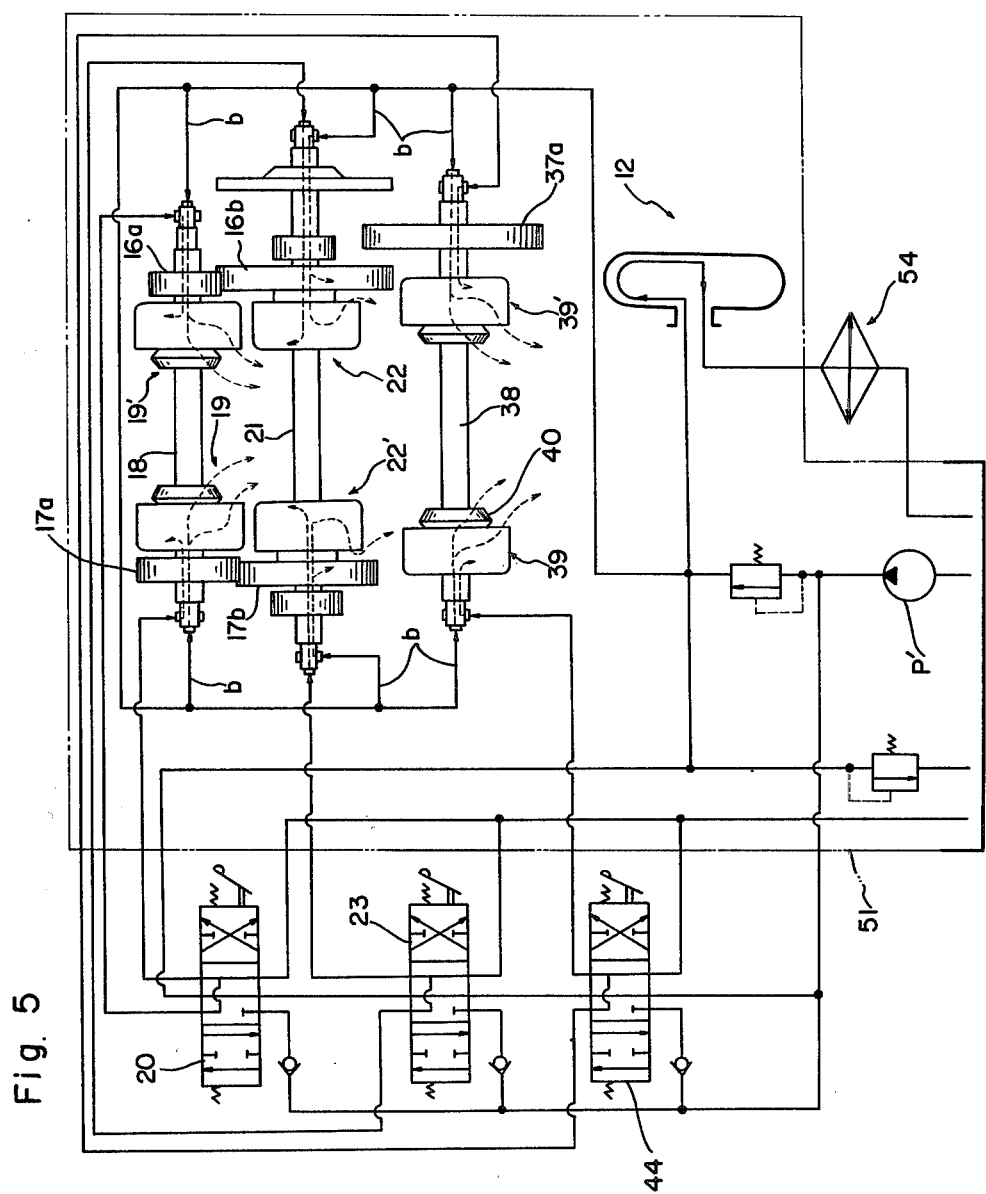
FIG. 5 is a schematic diagram of hydraulic circuitry of the driving system shown in FIG. 2.

The charger pump $P_1$ takes out the liquid via a filtered discharge outlet 52 and continuously supplies high pressure liquid to the torque converter 12 through casing wall and through bearing wall 53 journaling the output turbine shaft 13. As seen in FIG. 5, the control valves 20, 23 and 44 for the clutches 19, 19', 22, 22', 39 and 39' are connected, in parallel, the pressure liquid supply line, and a cooler 53 is inserted in the torque converter return path. There are also connected clutch-cooling ducts b as illustrated.

Actuation mechanisms for operating the forward and rearward travel changing over mechanism A and speed changer mechanism B; namely the control valves 20 and 23, respectively, are operated with single common operating device 24 as shown in FIG. 2.

The operating device 24 comprises an operating lever 56 for free operating pivotal rocking around a horizontal shaft 55 extending in the lateral direction of the vehicle, a first cam 25a and a second cam 25b, all connected to make up an integral entity.

The lever 56 may be set in neutral position as illustrated in FIG. 2, or may be moved over two-step ranges in either direction. By setting the lever 56 in the forward direction of the vehicle, forward travel of the vehicle at speed one or at speed two is obtained in step one or in step two of the lever setting. Similarly, by setting in the rearward direction of the vehicle, rearward travel at the said speed one or speed two is obtained in step one or step two of the lever setting. For this purpose, the first cam 25a is formed to keep the valve 20 in neutral position at neutral lever setting as seen in FIG. 2 and to shift the valve 20 in crossed position or straight position as illustrated at forward step one or rearward step one, respectively, of the lever setting which valve position is in either case retained when moved further to step two of the lever setting; and the second cam 25b is formed to keep the valve 23 in straight position as seen in FIG. 2 when the lever setting is at neutral or at step one either in the forward or rearward direction and to shift the valve 23 in crossed position only upon reaching step two either in the forward or rearward direction.

Thus, the rocking operation of the operating device 24 by the operating lever 56 gives forward travel in forward pull and rearward travel in rearward pull, and speed one at step one of the lever setting in either direction and speed two at further step two of the lever setting. With such simple and clear correspondence of the vehicle travel and the operating direction of the operating device 24, this structure precludes error in operation and is quite easy to operate.

It is here supposed that the output shaft 9 of the engine 5 rotates clockwise as seen from the torque converter side. Upon this supposition, how to operate the vehicle travel and turning with the driving mechanism 8 is now described.

The vehicle is started forward from the state of standstill corresponding to FIG. 2, where the engine 5 is driven but the clutches 19, 19' are both cut to release the drive transmission to the wheel axles 35, while the low speed clutch 22 is engaged and the clutches 39, 39' are both cut with the shafts 43 thus at standstill. First, the operating lever 56 is shifted to forward travel clutch 19 of the forward and rearward travel changing over mechanism A. Braking effort on the braking means 27 should at the same time be released. Engine power is thus transmitted to the wheel axles 35 via the torque converter 12, converter shaft 13, speed changer shaft 21 and planetary gearing set 28. The torque converter 12 will gradually increase the output rotation speed, and the vehicle is thus gradually accelerated under the low speed step. Straight travelling of the vehicle is obtained on the assumption that the two sun gears 42 of the planetary gearing sets on either side, with two shafts 43, are both at standstill. Since the two shafts 43, when anyhow rotate, must rotate in opposite directions with each other because of the constant meshing engagement between the bevel gears 40 and 41, uniform loading or travelling resistance on either side is the condition for the standstill of the sun gears 42, thus the straight travelling of the vehicle. Regulation of the travelling speed under this setting of the speed one may be made by manually adjusting the output rotation speed of the engine 5. If travelling speed in higher speed range is desired, then the operating lever 56 is shifted further forward to step two.

Rearward starting and selection of the speed range may just similarly be done by shifting the operating lever 56 to rearward step one or further step two. Either in the forward or rearward travel, retardation is done by giving proper braking effort on the shaft 21 by forcibly operating the braking means 27.

For stopping the running vehicle for a short while, the braking means 27 may be operated thus to release transmission of the driving rotation upon slipping of the torque converter 12. It is preferable, or mandatory especially in case of stopping for considerable length of time, to simultaneously operate for cutting the engaged clutch 19 or 19'.

For turning the running vehicle to the right or left, either the clutch 39 or 39' is selectively actuated.

For causing forward right turn, for instance, the clutch 39' is actuated to engage. Rotation of the shaft 38 is then transmitted to the two shafts 43 on either side in opposite directions with each other, in such manner that the shaft 43 for the right rear wheel 7 rotates inversely thus to reduce the rotation of the gear 33 integral with the planetary gear support 32 on that side, attaing therefore the right turn of the vehicle.

As is apparent, left turn is obtained by actuating the clutch 39.

When the vehicle is travelling at a low speed under reduced rotation of the engine 5 at such turning operation, then the speed ratio of the torque converter 12 is lowered, according to the characteristics of the torque converter in general, to have the value substantially less than unity. Rotation of the oppositely rotating shafts 43 driven from the input side of the torque converter 12 thus becomes relatively higher in comparison with rotation of the shaft 21 driven from the output side of the torque converter 12, resulting in greater relative speed difference with respect to the two running means 1 on either side and thus sharp turn with smaller radius of the turning curvature.

On the other hand, when the vehicle is travelling at high speed under increased rotation of the engine 5, then the speed ratio of the torque converter 12 is near unity, resulting in smaller relative speed difference with respect to the two running means 1 on either side and thus mild turn with larger radius of the turning curvature.

It has thus now made possible to automatically alter the radius of the turning curvature in response to the running speed, with additional possibility of modifying the range of such radius of the turning curvature by means of changing the speed with the speed changer mechanism B, in other words the free selection of the range of the radius of the turning curvature by means of selecting the running speed by manually operating the speed changer mechanism B besides the speed regulation by means of the engine itself.

Furthermore, the torque converter speed ratio during the turning operation may freely be lowered, near zero from near unity, by simultaneously operating the braking means 27 forcibly under any braking effort, thus to alter the radius of turning curvature accordingly. Therefore, very wide selection of the radius of turning curvature, or range of such radius, is realized.

For spinning turn, namely turning around at the standstill of the vehicle, either the clutch 39 or 39' as properly selected is actuated, with the clutches 19 and 19' both cut off and with the shaft 21 subjected to braking effort. The gears 33 on either side are then driven by the engine power and rotate in opposite directions with each other. Spinning turn is thus obtained, to the right of the forward direction of the vehicle with actuation of the clutch 39' and to the left with actuation of the clutch 39.

As modification of the illustrated embodiments, the shafts 43 may be fixed on to the planetary gear supports 32 supporting the planetary gears 31, while taking out the power to drive the axles 35 from the respective sun gears 42. The running means 1 may as well be of the type with crawler treads as propelled by wheel members 7 driven by the planetary gearing sets 28.

Figure 6:
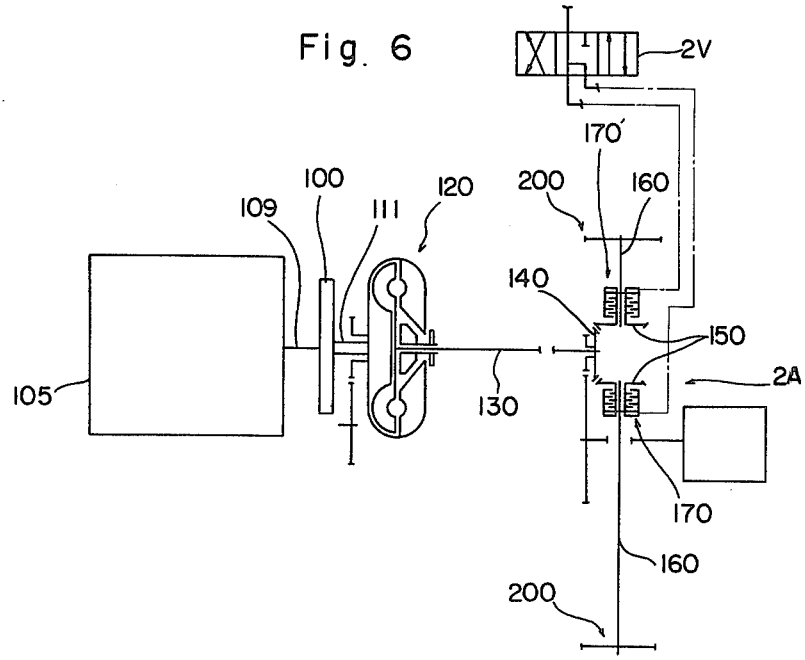
FIGS. 6 and 7 are schematic diagrams, showing only the essential portions, of the respective modified driving systems according to this invention.

A modified forward and rearward travel changing over mechanism shown in FIG. 6 is now described.

A flywheel 100 is provided on output shaft 109 of an engine 105. A torque converter 120 is operatively connected with flywheel shaft 111, and on turbine output shaft 130 thereof there is provided a bevel gear 140. Two output side bevel gears 150 are loosely fitted respectively on shaft members 160 opposedly and coaxially extending with each other at spacing interval therebetween, on opposing ends thereof, for free rotation relative thereto and both in constant meshing engagement with the bevel gear 140. Hydrostatic clutches 170 and 170' are provided in between the respective bevel gears 150 and the shafts 160, for freely engaging and disengaging the bevel gears 150 and the shafts 160, separately of each other, and actuating hydraulic fluid is supplied through a control valve 2V commonly for the clutches 170 and 170' and through hollow ducts in the shafts 160. In parallel with the shafts 160 there is provided a rotary shaft (not illustrated) which is in meshing engagement with both of the shafts 160 via a pair of gearings 200. With this construction, actuation of the valve 2V for neutralization or selective alternative engagement of either one of the clutches 170 and 170' will disconnect or transmit the rotation of the turbine output shaft 130 to the said rotary shaft, in any desired rotational direction, thus making up the forward and rearward travel changing over mechanism designated generally at 2A.

This construction makes it easy to assemble the component bevel gears and to adjust the backlash.

Figure 7:
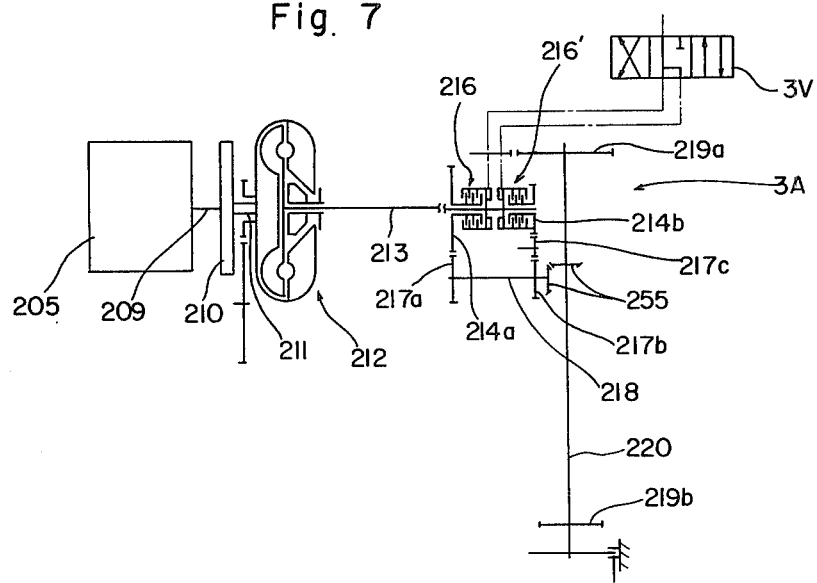

A further modified forward and rearward travel changing over mechanism shown in FIG. 7 is now described.

A flywheel 210 is provided on output shaft 209 of an engine 205. A torque converter 212 is operatively connected with flywheel shaft 211, and turbine output shaft thereof is here designated as input shaft 213 in this mechanism. Two spur gears 214a and 214b with different teeth number with each other are loosely fitted on the input shaft 213 for free rotation relative thereto, and hydrostatic clutches 216 and 216' are provided in between the input shaft 213 and the spur gears 214a and 214b, respectively, for free manual engagement and disengagement by operating a control valve 3V. An output shaft 218, provided with spur gears 217a and 217b, respectively, is disposed in parallel with the input shaft 213, with the gears 214a and 217a in meshing engagement with each other and with the gears 214b and 217b in operative connection with each other via an inverting intermediary gear 217c. A rotary transmission shaft 220 provided with two spur gears 219a and 219b with different teeth number with each other is disposed normal to the output shaft 218, and the shafts 218 and 220 are operatively interconnected by means of a pair of bevel gears 215. With this construction, actuation of the valve 3V for neutralization or selective alternative engagement of either one of the clutches 216 and 216' will disconnect or transmit the rotation of the input shaft 213 to the output shaft 218, in any desired rotational direction, thus making up the forward and rearward travel changing over mechanism designated generally at 3A.

This construction is simple in structure in comparison with other constructions incorporating many bevel gearing sets, and may economically be manufactured because of using the less expensive spur gears.

We claim:

1. A vehicle for civil engineering work, comprising: an engine; a torque converter; a pair of planetary gearing sets, each with a sun gear, planetary gears pivotally journaled on a planetary gear support, and an outer gear, operatively connected with the torque converter to take input power to the outer gear from output lateral side, operatively connected with the planetary gear support of the respective one of the planetary gearing sets; a turning drive mechanism with one input shaft and two output shafts to rotate in opposite directions one with the other, with the input shaft operatively connected with input side of the torque converter, and with the output shafts each operatively connected with the sun gear of the planetary gearing, switching over means for selectively switching over rotation directions of the output shafts of the turning drive mechanism driven from the input side of the torque converter rotating in a constant direction, a forward and rearward travel changing over mechanism provided in between the torque converter output side and the planetary gearing sets, for changing over directions of input rotations to the planetary gearing sets, with neutral position for releasing the input rotations to the planetary gearing sets, a speed changer mechanism shiftable betwen two gearing positions for high and low speeds, respectively, provided in between the forward and rearward travel changing over mechanism and the planetary gearing sets, wherein the forward and rearward travel changing over mechanism comprises at least a bevel gear provided on output shaft of the torque converter, a pair of bevel gears in constant meshing engagement with the said bevel gear, a shaft which is provided with spur gears having different teeth numbers and on which the said pair of bevel gears are loosely fitted for free rotation relative hereto, and a pair of hydrostatic clutches for separately engaging and disengaging the said shaft and the said pair of bevel gears, respectively, and wherein the speed changer mechanism comprises at least two speed changer gears in mesh with the spur gears having different teeth numbers, respectively, a shaft on which the speed changer gears are loosely fitted for free rotation relative hereto, and clutches for separately engaging and disengaging the shaft and the speed changer gears, respectively.

2. The vehicle of claim 1 wherein said turning drive mechanism further comprises four bevel gears and two clutches which are so arranged that the input shaft may be rotated in opposite directions when one of the clutches is operated.

3. The vehicle of claim 1, further comprising an operating device shiftable over full entire range covering forward positions I and II and rearward positions I and II on either side of neutral position thereof, so arranged that setting the device in the neutral position keeps the forward and rearward travel changing over mechanism in neutral position thereof and the speed changer mechanism in the low speed gearing thereof, that setting the device in position I in either forward or rearward direction shifts the forward and rearward travel changing over mechanism in one or the other, respectively, of the two opposite gearing positions thereof, while still keeping the speed changer mechanism in the low speed gearing thereof, and that setting the device in position II in either forward or rearward direction shifts the speed changer mechanism in the high speed gearing thereof, while keeping the forward and rearward travel changing mechanism in the gearing position just as in the said previous position I of the setting of this device.

4. The vehicle of claim 1, wherein the forward and rearward travel changing over mechanism comprises at least a bevel gear provided on output shaft of the torque converter, a pair of bevel gears in constant meshing engagement with the said bevel gear, two shafts which are opposedly and coaxially extending with each other and on which the said pair of bevel gears, respectively, are loosely fitted for free rotation relative hereto, and a pair of hydrostatic clutches for separately engaging and disengaging the said shafts and the said pair of bevel gears, respectively.

5. The vehicle of claim 1, wherein the forward and rearward travel changing over mechanism comprises at least two spur gears loosely fitted on output shaft of the torque converter for free rotation relative thereto, a pair of hydrostatic clutches for separately engaging and disengaging the torque converter output shaft and the two spur gears, respectively, an intermediary inversion gear in meshing with one of the two spur gears, and a shaft provided with a pair of gears in meshing with the inversion gear and the other one of the two spur gears, respectively.

* * * * *